United States Patent [19]

Barker et al.

[11] Patent Number: 4,714,918

[45] Date of Patent: Dec. 22, 1987

[54] WINDOW VIEW CONTROL

[75] Inventors: Barbara A. Barker, Round Rock; Irene H. Hernández, Austin, both of Tex.

[73] Assignee: International Business Machines Corporation, Armonk, N.Y.

[21] Appl. No.: 605,545

[22] Filed: Apr. 30, 1984

[51] Int. Cl.⁴ .............................................. G09G 1/16
[52] U.S. Cl. ................................... 340/724; 340/709; 340/726
[58] Field of Search ............... 340/724, 726, 730, 731, 340/721, 709

[56] References Cited

U.S. PATENT DOCUMENTS

| | | | |
|---|---|---|---|
| 4,412,294 | 10/1983 | Watts et al. | 340/726 |
| 4,428,065 | 1/1984 | Duvall et al. | 340/731 |
| 4,484,302 | 11/1984 | Cason et al. | 340/721 |
| 4,533,910 | 8/1985 | Sukonick et al. | 340/724 |
| 4,550,315 | 10/1985 | Bass et al. | 340/721 |

FOREIGN PATENT DOCUMENTS

| | | | |
|---|---|---|---|
| 0108520 | 5/1984 | European Pat. Off. | 340/709 |
| 59-68042 | 4/1984 | Japan | 340/709 |

OTHER PUBLICATIONS

Williams, Gregg., "The Lisa Computer System", *Byte*, Feb. 1983, pp. 33-50.

*Primary Examiner*—Marshall M. Curtis
*Attorney, Agent, or Firm*—J. H. Barksdale, Jr.; H. St. Julian

[57] ABSTRACT

A method of, and system for, controlling a view of window information upon editing the information. The view is controlled based on mode selection. For normal information input operations, information scrolling is selected. Related existing information adjacent the newly input information will be viewable, but remote information will eventually be scrolled out of the window. For those instances where all existing information is to remain viewable upon input of additional information, border scrolling will result in a varying of the size of the window.

9 Claims, 9 Drawing Figures

BORDER SCROLLING

INFORMATION SCROLLING

WINDOW VIEW CONTROL

TECHNICAL FIELD

This invention relates generally to display windowing, and more specifically to varying a view through a window upon editing window information.

BACKGROUND ART

Information scrolling is well known in the prior art. An operator of an application driven keyboard/display standalone or host connected computer work station or system can effect scrolling by keying textual information against the bottom of the display screen. Scrolling here is an automatic rolling up of information on the screen under system control, and is dynamic and to a sufficient extent for the operator to key in additional line(s) of information. In addition, scrolling information within a window on the display screen is also known.

With the IBM Displaywriter Reportpack application program, field width expansion is automatic. However, expansion is only intermittently dynamic. That is, as the right hand side of a record field is keyed against, the right hand side is moved a specified number of units to the right. The right hand side does not again move until keyed against.

In the above, by keying against the bottom of the screen is meant completion of keying on the last line on the screen. Upon completion of the last line as when no more room or vacant lines are available for keying, scrolling is in order. By keying against the right hand side of a record field is meant keying a character in the last character position of the field. Without expansion of the field, the next keyed character would overrun the field.

Based on the above, dynamic and automatic information scrolling is an old concept. Also, a semblance of dynamic and automatic window expansion is old. This art is pertinent to varying degrees, but falls short of either anticipating the instant invention or rendering the instant invention obvious. The instant invention presents an advance over the prior art in that both automatic and dynamic information and window border scrolling are available to an operator through mode selection, and occur upon editing. In addition, window border scrolling follows the contents of the window. As information is added, the window is increased in size. In like manner, as information is deleted, the window is diminished in size. The advantages of the above advances are improved operator flexibility, system useability, and screen utilization.

DISCLOSURE OF THE INVENTION

A unique method of, and system for, controlling a view of window information or data is provided in order to improve operator and system flexibility, and system ease of use. View control is through mode selection. If existing information is not needed for comparison purposes, an information scrolling mode is selected. As new information is added to the existing information, there is a scrolling of the information to make room for the added information. The existing information will eventually be scrolled out of the window. If a comparison is necessary, a border scrolling mode is selected. When operation is in this mode and information is added to the window information, a border is moved for enlarging the window in order to accept the added information, and provide a view of both the existing and added information.

BEST MODE FOR CARRYING OUT THE INVENTION

Figure 1:
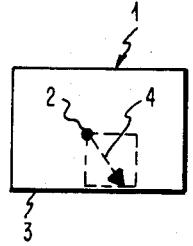
FIG. 1 illustrates a display window with a cursor being moved toward the bottom border while operating in a border scrolling mode.

For a more detailed understanding of this invention, reference is first made to FIG. 1. In this figure there is illustrated a window 1 which it is to be assumed is being displayed on all points addressable cathode ray tube display screen of a device controlled standalone or host connected computer work station or system. Display and control of window 1 can be by means of an application program useable by the workstation.

Window 1 is bordered as shown, has dimensions smaller than those of the display screen, and provides a view into information not generally displayed on the remainder of the screen. When operation is within the window, the point of operation can be denoted by a cursor 2. As cursor 2 is moved by a device, the point of operation is moved. The device can be a mouse, keyboard, joystick, etc. The particular characteristics of cursor 2 are unimportant as far as this invention is concerned. That is, the cursor could be a standard textual type cursor, a pointing cursor, located adjacent the next available character box, etc. Cursor location and movement are directly related to editing. Editing encompasses insertion, deletion, replacement, etc., operations. Of course, it is to be appreciated that there are instances where editing can be accomplished independently of cursor location and motion.

As has been pointed out, there are two scrolling modes of operation. One is a border scrolling mode of operation. When this mode is selected by an operator of the workstation, cursor motion will thereafter be under device control. If text is being keyed into the window, as each character is keyed, the cursor will move to the next character position. The cursor can also be moved by the space bar, cursor motion keys, etc., on the keyboard. In addition, the cursor can be moved by a mouse, etc. Cursor motion control can also be part of the application program referred to above. The application program will be one that is ported to a particular operating system being utilized by the workstation or host system.

Figure 2:
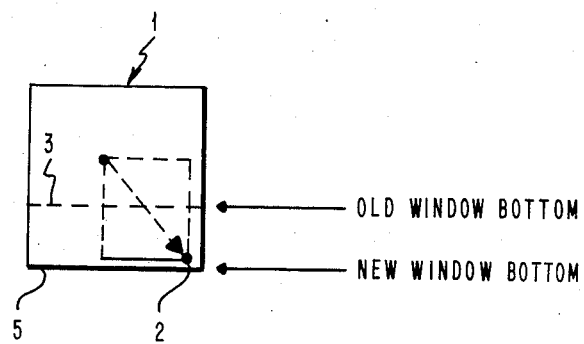
FIG. 2 illustrates the scrolling of the bottom border of the window of FIG. 1 as the cursor is moved beyond the border's original position.

As cursor 2 is moved toward the bottom border 3 of window 1 as indicated by arrow 4, the limits of window 1 will begin to be met. Assume the information about cursor 2 is of utmost importance and continued viewing is highly desirable as the point of operation becomes more remote therefrom. In order to accommodate this desire to view both the original and new points of operation, window enlargement is necessary. In order to efficiently manage viewing both points of operation and at the same time dedicate no more screen area than necessary to the window, dynamic border scrolling is provided. Upon cursor 2 being moved down against border 3, any continued downward movement will result in border 3 following cursor 2. This is illustrated in FIG. 2 wherein cursor 2 has been moved beyond the original limits or borders of window 1 of FIG. 1. Bottom border 3 will have taken on a new position 5.

Figure 3:
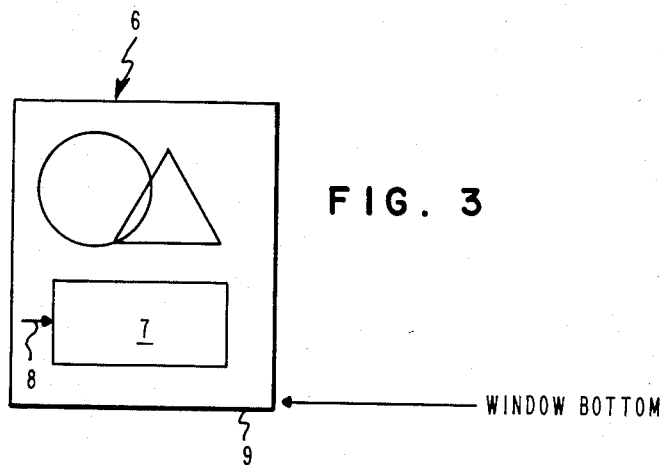
FIG. 3 illustrates a window containing graphic objects with operation in a border scrolling mode.
Figure 4:
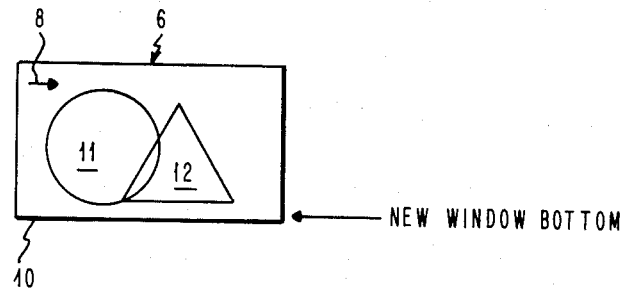
FIG. 4 illustrates a scrolling of the bottom border of the window of FIG. 3 upon deletion of an object from the window.

Referring next to FIG. 3, there is shown a display window 6 containing a number of graphic objects. It is now to be assumed that graphic object or rectangle 7 is being addressed or pointed to by pointing cursor 8, and that object 7 is to be deleted. Since object 7 occupies a dedicated portion of window 6, this portion is no longer needed upon deletion. Upon deletion, bottom border 9 of window 6 will be repositioned or moved to new position 10 as shown in FIG. 4. Also, cursor 8 will have been repositioned to the top of window 6. Remaining will be a larger portion of the display screen for other chores.

As pointed out above, object 7 occupies a dedicated portion of window 6 and determines the location of bottom border 9. Border 9 follows the bottom of the dedicated portion and upon deletion is repositioned to position 10. Position 10 is now determined by the bottom of the portion dedicated to the upper objects 11 and 12.

From the above, operator editing actions cause an enlargement or diminishing of size of the windows. For the case related to FIGS. 1 and 2, cursoring out of the original window will result in a window enlargement. For the case related to FIGS. 3 and 4, deletion will result in a diminishing of the size of the windows.

Figure 5:
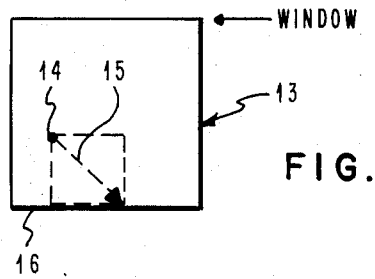
FIG. 5 illustrates a display window with a cursor being moved toward the bottom border while operating in an information scrolling mode.

Refer next to FIG. 5. Addressed now will be the other mode of operation. This mode of operation is an information scrolling mode and is standard and well known. This mode works very well in an environment where viewing of related existing and/or remote information is not important. It is most often used in text processing.

Figure 6:
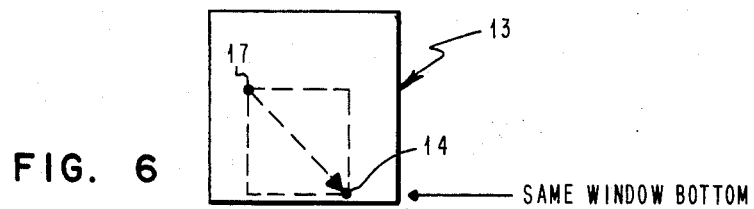
FIG. 6 illustrates the scrolling of information in the window of FIG. 5 as the cursor continues to be moved toward the bottom border.

As cursor 14 in window 13 is moved in the direction of arrow 15 toward bottom border 16, there will be an upward scrolling of the information in window 13. This is illustrated in FIG. 6 where the original position 17 of cursor 14 exists higher in window 13.

Figure 7:
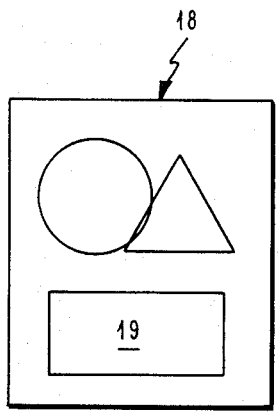
FIG. 7 illustrates a window containing graphic objects with operation in an information scrolling mode.
Figure 8:
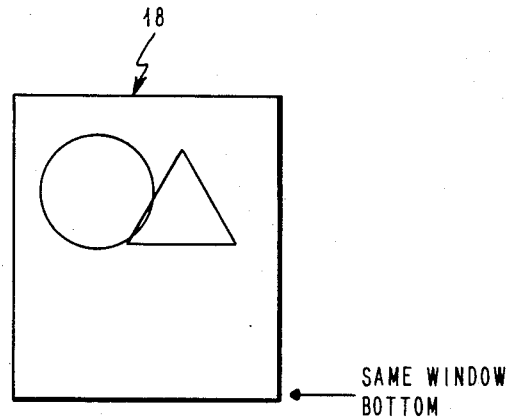
FIG. 8 illustrates the window of FIG. 7 following deletion of an object.

Refer next to FIGS. 7 and 8. As with FIGS. 5 and 6, there are graphic objects within window 18 and it is to be assumed that object 19 in FIG. 7 is to be deleted. Since operation is in an information scrolling mode, the information in the upper portion of window 18 will remain in tact upon deletion of rectangle 19 as shown in FIG. 8.

Figure 9:
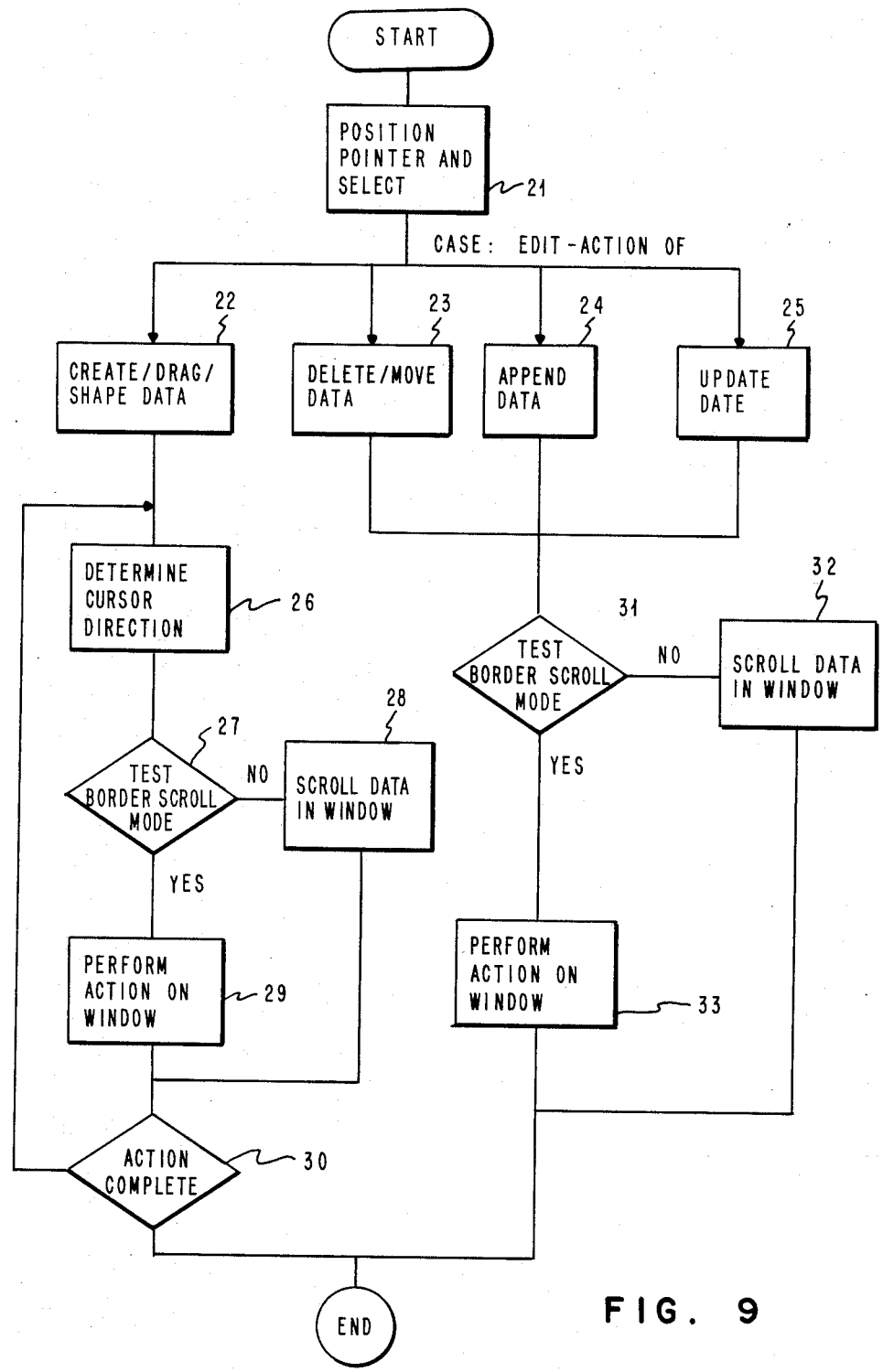
FIG. 9 is a flow chart illustrating operator and system operations performed in carrying out the instant invention.

Reference is next made to the flow chart of FIG. 9 which illustrates operator and system operations for varying a window view based on mode selection and editing actions.

First, the operator fetches a pointer or cursor. The operator then moves the pointer on the display screen by means of a locator device, such as a mouse, until the pointer is coincident with an object to be selected or a location for an object to be created. When the pointer is coincident with the object or location, the operator presses a button or switch on the mouse to select the object or location. Selection of the object or location effects a call for a routine based on the action to be performed. The positioning and selecting operations are depicted by block 21. The action to occur is defined prior to editing of the selected object or location. In addition, the particular scrolling mode is selected prior to editing.

If the action to occur is during creation, dragging, or shaping of an object, the operator action is to continue to hold the button pressed as indicated by block 22. As the mouse is moved from the starting selected position, the object which is being created, dragged, or shaped is moved in the direction of mouse movement as indicated by block 26. As the object is moved in the direction of the movement of the mouse and the edge of the window border is reached, the selected scrolling mode determines what is to happen to the window. This is indicated by block 27. If border scrolling has been selected, the window will automatically increase in size as the mouse is moved beyond the original borders or limits of the window. In like manner, the window will shrink in size as the mouse is moved back inward toward information originally within the window. This is indicated by block 29. If an information scrolling mode has been selected, the information within the window will scroll and the window dimensions will remain stationary as indicated by block 28. As the operator continues to hold the button depressed, the same operations can continue to be performed as indicated by block 30. When the operator releases the button, the selected scrolling mode operations are terminated.

If the action to occur is during deletion or movement of an object, the information is deleted from the window as indicated by block 23. If the action to occur is a result of appending or adding information, the information is appended to the object in the window as indicated by block 24. If the action to occur is during updating the information, the information is updated in the window as indicated by block 25. When deleting, moving, appending, or updating information in the window, the selected scrolling mode determines what is to happen to the window as a result of the action on the object as indicated by block 31. If a border scrolling mode has been selected, the window will automatically increase or decrease in size depending on the type of action as indicated by block 33. If an information scrolling mode has been selected, the information will scroll within the window and the window dimensions will remain stationary as indicated by block 32.

```
ON POINTER SELECTION
CALL SET__EDIT__ACTION
CASE OF EDIT__ACTION
CASE: 'CREATE__DATA','DRAG__DATA','SHAPE__DATA'
(*implicit*)
PERFORM UNTIL ACTION IS COMPLETE
CALL PC__DIRECTION
CASE OF PC__DIRECTION
CASE: 'OUTWARD'
IF DATA BOUNDARY = WINDOW BOUNDARY
THEN IF BORDER SCROLLING MODE AND
IF WINDOW BOUNDARY < SCREEN
```

```
                                -continued
BOUNDARY
THEN INCREASE WINDOW BOUNDARY
ELSE SCROLL
ENDIF
ENDIF
CASE: 'INWARD'
IF BORDER SCROLLING MODE
THEN IF WINDOW BOUNDARY < SCREEN
BOUNDARY AND
IF WINDOW BOUNDARY > MAX BOUNDARY
OF ALL DATA
THEN SHRINK WINDOW BOUNDARY
ENDIF
ENDIF
ENDCASE
ENDLOOP
CASE: 'DELETE_DATA', 'MOVE_DATA' (*explicit*)
CALL ERASE_DATA (DTYPE,X,Y,DSIZE)
IF MAX BOUNDARY < WINDOW BOUNDARY AND
IF WINDOW BOUNDARY < SCREEN BOUNDARY AND
IF BORDER SCROLLING MODE
THEN CALL SHRINK_WINDOW
ENDIF
CASE: 'APPEND_DATA' (*explicit*)
CALL ADD_DATA (DTYPE, X, Y, DSIZE)
IF (OLD_DATA_BOUNDARY +
NEW_DATA_BOUNDARY DELTA) >
WINDOW BOUNDARY AND
IF WINDOW BOUNDARY < SCREEN BOUNDARY AND
IF BORDER SCROLLING MODE
THEN INCREASE WINDOW BOUNDARY
ELSE SCROLL
ENDIF
CASE: 'UPDATE_DATA' (*explicit*)
CALL UPDATE_DATA (DTYPE, X, Y, DACTION)
IF NEW_DATA BOUNDARY > OLD_DATA_BOUNDARY
THEN IF NEW_DATA_BOUNDARY > WINDOW
BOUNDARY AND
IF WINDOW BOUNDARY < SCREEN BOUNDARY AND
IF BORDER SCROLLING MODE
THEN INCREASE WINDOW BOUNDARY
ELSE SCROLL
ENDIF
ELSE IF NEW_DATA_BOUNDARY < WINDOW
BOUNDARY AND
IF WINDOW BOUNDARY < SCREEN BOUNDARY AND
IF BORDER SCROLLING MODE
THEN SHRINK WINDOW
ENDIF
ENDIF
ENDCASE
```

Set out below is an illustration of a application program useable by a processor in the workstation or host for causing a varying of the view through a window upon editing window information. This program is in program design language from which source and machine code are derivable. In the following it is to be assumed that the workstation is under mouse and keyboard device control.

When the mouse button is pressed and a location within a window is defined, a routine is called to determine the editing action. (CALL SET_EDIT_ACTION) The editing action can either be implicit or explicit. Implicit actions are defined by the cursor type specified by the operator and explicit actions are defined by a selected command.

If the edit_action causes information to be created, dragged (moved) or shaped, an implicit action is occurring. As long as the mouse button is held down, the implicit action is continued. (UNTIL ACTION IS COMPLETE) The direction of the movement of the cursor determines the direction of the implicit action. A routine is called to determine whether the movement is outward and away from the defined window location, or inward and toward the defined window location. (CALL PC_DIRECTION) As the cursor is moved out, new data or information location points are defined in the window. As the cursor is moved in, existing data points are redefined or removed.

Implicit movement of a cursor type within a window redefines the boundary of the data object at the selected window location. If the boundary of the data becomes equal to the left, right, top or bottom boundary of the window, the selected scrolling mode is used to control the view of the data. The window mode is selected by the operator prior to initiating the edit action. If a border scrolling mode is selected and if the affected window boundary is less than the corresponding screen boundary, then the window border is enlarged. If an information scrolling mode is selected or if the window boundary is as large or larger than the corresponding screen boundary, then the information contained within the window is scrolled to bring into view the added information.

When the cursor is moved inward, the window mode is used to determine if there is to be any change to the window boundary or borders. If the window boundary is less than the corresponding screen boundary and if the boundary of the rest of the data in the window is less than the window boundary, then the window is decreased in size through border movement. If the boundary of the rest of the data is the same as the window boundary, then there is to be no change to any window border.

Explicit editing actions cause information to be deleted, moved, appended or updated. If the edit case is 'Delete_Data' or 'Move_Data', a routine is called to erase the information from the window. (ERASE_DATA) The input parameters are the type of information or data, the (X,Y) location of the information and the size of the information to be deleted. If the boundary of the remainder of the information is less than the corresponding window boundary, the window boundary is still less than the corresponding screen boundary, and a border scrolling mode has been selected, then a routine is called to decrease the size of the window by moving a border. (CALL SHRINK_WINDOW)

If the edit case is 'Append_Data' then a routine is called to add the new data or information to the existing information in the window. (CALL ADD_DATA) The input parameters are the type of data, the (X,Y) location of the data and the size of the data to add. If the old data boundary plus the delta change for the new data boundary is greater than the corresponding window boundary and if the window boundary is still less than the screen boundary and if in border scrolling mode, then a window border is moved in order to increase the window size for viewing both existing and added information. If any of the above conditions are not met, then the information within the window is scrolled to bring the new data into view.

For the 'Update_Data' explicit case, a routine is called to execute the edit action to update the contents of the window. (CALL UPDATE_DATA) The input parameters are the type of data, the (X,Y) location, and the action. If the result of the edit action causes the information to increase in height, then the same determinations are made that were made in the 'Append_Data' case, and the same results occur. If the result of the edit action causes the information to decrease, then the same determinations are made that were made in the 'Delete_Data' and 'Move_Data' cases, and the same results occur.

In summary, a unique method of, and system for, controlling a view of window information or data is provided in order to improve operator and system flexibility, and system ease of use. View control is through mode selection. If existing information is not needed for comparison purposes, an information scrolling mode is selected. As new information is added to the existing information, there is a scrolling of the information to make room for the added information. The existing information will eventually be scrolled out of the window. If a comparison is necessary, a border scrolling mode is selected. When operation is in this mode and information is added to the window information, a border is moved for enlarging the window in order to accept the added information, and provide a view of both the existing and added information.

While the invention has been particularly shown and described with reference to a preferred embodiment, it will be understood by those skilled in the art that various changes in form and detail may be made without departing from the spirit and scope of the invention.

We claim:

1. In a display computer system, a method of controlling a view of information displayable within a window upon editing said information wherein said window is displayable over other information being displayed on said system, said method comprising:
   (a) providing said system with both an information scrolling mode and a border scrolling mode of operation;
   (b) selecting one of said modes operation; and
   (c) causing window to increase in size, responsive to a border scrolling mode being selected, upon the addition of new information to said existing information being displayed in said window.

2. A method according to claim 1 wherein said existing information is included in an existing document and wherein said method further includes causing said window to decrease in size upon deleting existing information being displayed in said window from said document.

3. A method according to claim 1 including causing said existing information being displayed in said window to scroll within said window upon the addition of said new information to said existing information being displayed in said window when an information scrolling mode has been selected.

4. A method according to claim 1 including selecting between said modes prior to editing said information.

5. A method according to claim 1 including causing said information to be scrolled when said window has been increased in size up to a dimension of a display screen within which said window is displayed.

6. A method according to claim 1 including causing said window to increase in size upon attempting to edit information outside said window when a border scrolling mode has been selected.

7. A display computer system for controlling a view of information displayable within a window within a screen on a display device included in said system wherein said window is displayable over other information being displayed on said screen, said system comprising:
   (a) means for proving an information scrolling mode and a border scrolling mode of operation;
   (b) means for selecting one of said modes of operation; and
   (c) means based on selection of a border scrolling mode of operation for causing said window to increase in size upon the addition of new information to existing information being displayed in said window.

8. A system according to claim 7 including means for causing said window to decrease in size upon deleting information from said window.

9. A system according to claim 8 including means for causing said window information to scroll within said window upon adding information to said window information when an information scrolling mode is selected.

* * * * *

UNITED STATES PATENT AND TRADEMARK OFFICE
CERTIFICATE OF CORRECTION

PATENT NO. : 4,714,918

DATED : December 22, 1987

INVENTOR(S) : B. A. Barker et al

It is certified that error appears in the above-identified patent and that said Letters Patent is hereby corrected as shown below:

Col. 7, line 34, before "window" insert --said--.

Signed and Sealed this

Fourth Day of February, 1992

*Attest:*

HARRY F. MANBECK, JR.

*Attesting Officer*       *Commissioner of Patents and Trademarks*